United States Patent
Yamamoto

(10) Patent No.: US 8,009,306 B2
(45) Date of Patent: Aug. 30, 2011

(54) PRINTING APPARATUS AND PRINT SYSTEM

(75) Inventor: Yukio Yamamoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1452 days.

(21) Appl. No.: 11/432,318

(22) Filed: May 12, 2006

(65) Prior Publication Data

US 2006/0256364 A1 Nov. 16, 2006

(30) Foreign Application Priority Data

May 13, 2005 (JP) .................................. 2005-140548
Apr. 21, 2006 (JP) .................................. 2006-117981

(51) Int. Cl.
G06K 15/00 (2006.01)
G06F 3/12 (2006.01)

(52) U.S. Cl. ...................................... 358/1.14; 358/1.15

(58) Field of Classification Search ................ 358/1.14, 358/1.15, 1.18, 1.1, 1.6, 1.9, 1.13, 1.16, 1.17, 358/400, 401, 404, 407, 444, 468; 347/2, 347/3, 5, 14, 23; 399/1, 8, 9; 713/150, 155, 713/161, 168, 169, 170, 176; 380/243, 51, 380/55

See application file for complete search history.

(56) References Cited

U.S. PATENT DOCUMENTS 6,307,640 B1* 10/2001 Motegi .......................... 358/1.14
7,463,374 B2* 12/2008 Corlett et al. ................ 358/1.14
2004/0032619 A1   2/2004 Izaki

FOREIGN PATENT DOCUMENTS

JP   2004-074499   3/2004

* cited by examiner

Primary Examiner — Dov Popovici
(74) Attorney, Agent, or Firm — Rabin & Berdo, P.C.

(57) ABSTRACT

A print data forming apparatus has an authentication information setting unit which sets authentication information into a print job. A print processing apparatus has: a print job storing unit which receives and stores the print job in which the authentication information has been set; an operation panel control unit which receives the authentication information based on a print request; an authentication discriminating unit which compares the authentication information based on the print request received through the operation panel control unit with the authentication information of the stored print job, thereby discriminating whether or not they coincide; and a print job managing unit which, if they coincide, allows all print jobs having the authentication information that coincides with the authentication information based on the print request among the stored print jobs to be print-processed. A print system which can perform the authentication printing with high workability is obtained.

18 Claims, 11 Drawing Sheets

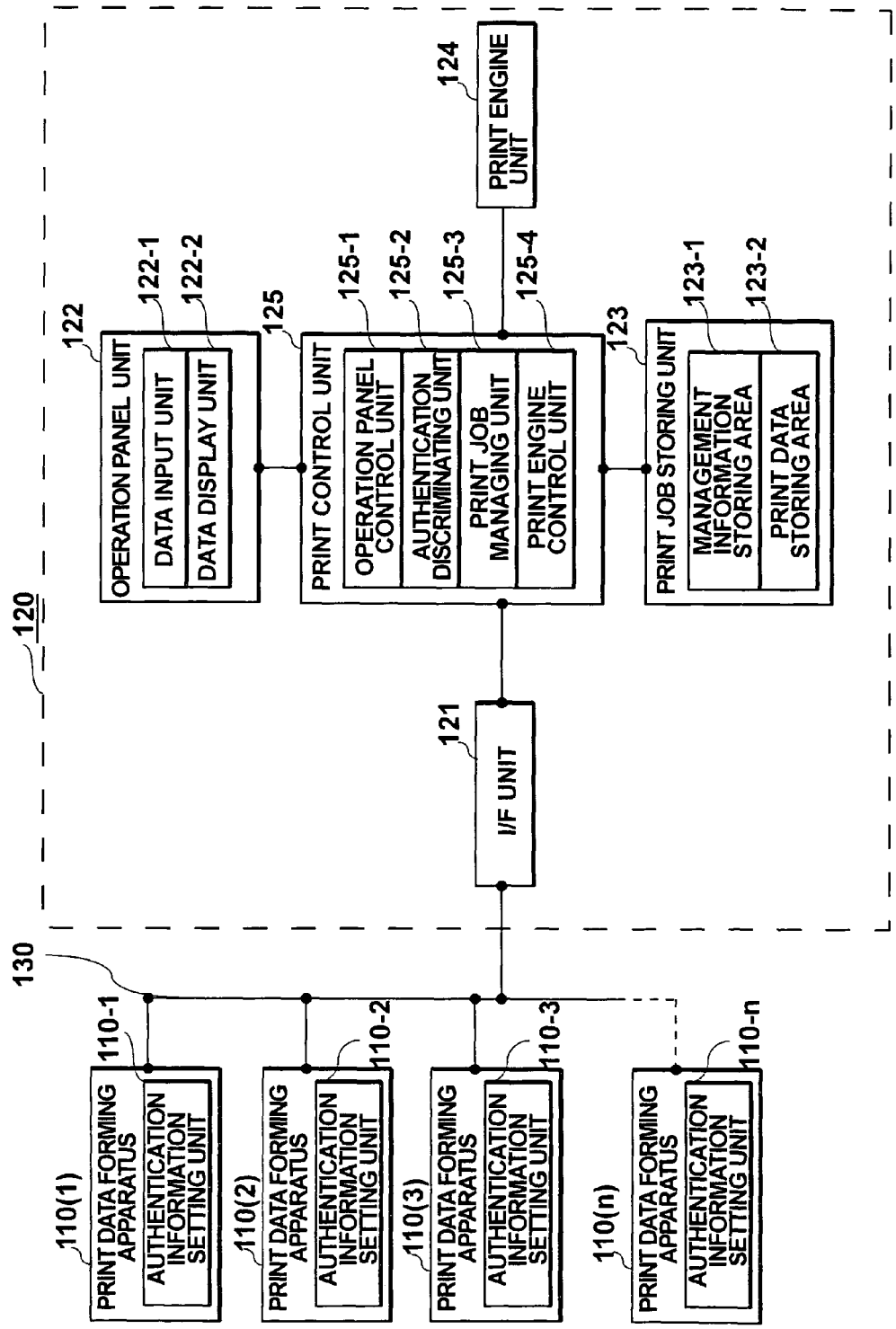

FIG.2A

```
%-12345X
@PJL ***SECURE PASSWORD=12345678
@PJL JOB NAME="SECURE DOCUMENT"
@PJL USR ID="abcd"
@PJL SET XXXXXCLEANINGMODE=OFF
@PJL ENTER LANGUAGE=XXXXSCRIPT
%!PJL-XXXX-3.0
%%Title:<566973696F2D92F188C48F91907D2E767364>
......
......
%-12345X %-12345X@PJL EOJ
```

FIG.2B

PRINT OPTION

PRINT FORMAT

○ NORMAL PRINTING
● AUTHENTICATION PRINTING
○ STORAGE INTO HARD DISK

AUTHENTICATION SETTING

JOB NAME: SECURE DOCUMENT
PASSWORD: ********
USER ID: abcd

FIG.10

Reserve After Printing

No
Yes
Reprint

FIG.11

SELECT USER ID

PASSWORD CORRESPONDING DATA
USER ID   DATA NAME (JOB NAME)
abcd         PRINT DATA 3
abcd         SECURE DOCUMENT
XYZ          PRINT DATA 5
INPUT USER ID/ DATA NAME (999:ALL ID)

abcd_

PRINTING APPARATUS AND PRINT SYSTEM

BACKGROUND OF THE INVENTION

1. Field of the Invention

The invention relates to a printing apparatus and a print system for holding security of a print document.

2. Related Background Art

In recent years, a network print system which is connected to a network and used by a plurality of users has been spread (refer to JP-A-2004-74499). In such a print system, print data is formed by the user by using a host computer connected to the network. When the user instructs execution of printing from the host computer, a print job including the print data is formed and sent from the host computer to a printer through the network. The printer receives the print job and executes a printing process.

In the above network print system, the printer is often arranged at a position away from the host computer which is used by the user. Therefore, there is a risk that after the user instructed the execution of the printing from the host computer, a print document is seen by another person or is purposely taken away by another person before he obtains an instructed print document. To eliminate such a risk, the following "authentication printing" is ordinarily used.

In the ordinary authentication printing, the user sets a user name and a password into a print job and sends the print job from the host computer to the printer through the network. When there is a print request, the printer displays a list of print jobs received from the host computer onto an operation panel and waits for selection by a print requestor (it is not always necessary that the print requestor coincides with the user). The print requestor inputs a user name and a password through the operation panel and selects a predetermined print job from the list of the print jobs. The printer discriminates whether or not the inputted user name and password coincide with the user name and password added to the print job. If they coincide, the printer executes the printing process of the selected print job.

In the "authentication printing", when a plurality of print jobs are sent from the same user to the printer through the network, the plurality of print jobs are displayed on the print job list in a form without any correlation. Therefore, in order to execute the print requests of the plurality of print jobs sent from the same user by the print requestor, he needs to input the user name and the password through the operation panel with respect to each of the plurality of print jobs and individually select a desired print job from the print job list.

It is a problem to be solved that in the conventional authentication printing, in order to execute the print request of the plurality of print jobs sent from the same user by the print requestor, he needs to input the user name and the password through the operation panel with respect to each of the plurality of print jobs and individually select a desired print job from the print job list, and workability is low and, further, partial print missing is liable to be caused by an erroneous input or the like of the user name and the password.

SUMMARY OF THE INVENTION

According to the invention, there is provided a printing apparatus and a print system for holding security of a print document.

That is, the present invention provided a print system comprising a print data forming apparatus which forms and outputs print data to which authentication information has been added; and a print processing apparatus which receives the print data added with the authentication information and stores it into a print data storing unit, wherein the print processing apparatus includes an authentication information input unit which inputs the authentication information, an extracting unit which extracts all of the print data added with the authentication information that coincides with the input authentication information from the print data storing unit, and a data supplying unit which supplies all of the print data extracted by the extracting unit to a printing unit.

Moreover, the system may further comprise a user identification input unit which inputs user identification data; and a second extracting unit which extracts the print data corresponding to the user identification data from the print data extracted by the extracting unit, and wherein the data supplying unit supplies the print data extracted by the second extracting unit.

Moreover, the system may further comprise a display unit which rearranges the user identification data provided for the print data extracted by the extracting unit and displays information of the print data together with the user identification data.

Moreover, in the system, the user identification data may be user identification information.

Moreover, in the system, the user identification data may be at least a part of a data name added to a job.

Further, the present invention provided A print system comprising a print data forming apparatus having an authentication information setting unit which sets authentication information into a print job; and a print processing apparatus having a print job storing unit which receives and stores the print job in which the authentication information has been set, an operation panel control unit which receives authentication information based on a print request, an authentication discriminating unit which compares the authentication information that is based on the print request and has been received through the operation panel control unit with the authentication information of the print job stored in the print job storing unit, thereby discriminating whether or not they coincide, and a print job managing unit which, if a discrimination result by the authentication discriminating unit indicates that they coincide, allows all of the print jobs having the authentication information that coincides with the authentication information based on the print request among the print jobs stored in the print job storing unit to be print-processed.

Moreover, in the system, the print job storing unit may have a management information storing area and a print data storing area, and the print job managing unit divides the print job into the authentication information and print data in receiving order of the print jobs, stores the print data into the print data storing area, and stores addresses of the print data into the management information storing area in a lump every the authentication information.

Moreover, in the system, during progress of a printing process of the print job in which the authentication information has been set, if the print job in which the authentication information has been set is further received, the print job managing unit stops the processes for dividing the print job into the authentication information and the print data, storing the print data into the print data storing area, and storing the addresses of the print data into the management information storing area in a lump every the authentication information until the printing process which is being progressed is finished.

Moreover, in the system, when a predetermined printing process is finished, the print job managing unit deletes all of the print data whose printing process has been finished from the print job storing unit.

Moreover, the system may further comprise a secure managing unit which stops the deletion of the print data from the print job storing unit after the end of the printing process, thereby enabling reprint to be designated.

Moreover, the system may further comprise a print engine control unit which allows predetermined print data of a requested number of print copies to be print-processed on the basis of the requested number of print copies received through the operation panel control unit.

Further, the present invention provided a print processing apparatus for receiving print data to which data authentication information is related and executing a printing process, comprising a print data storing unit which receives the print data to which the data authentication information is related and stores it; a process authentication information input unit which inputs process authentication information before printed matter is outputted; an extracting unit which extracts the print data to which the data authentication information corresponding to the process authentication information is related; and a print data output unit which outputs all of the print data extracted by the extracting unit to a printing unit.

Moreover, the apparatus may further comprise a user identification input unit which inputs user identification data; and a second extracting unit which extracts the print data corresponding to the user identification data from the print data extracted by the extracting unit, and wherein the print data output unit outputs the print data extracted by the second extracting unit.

Moreover, the apparatus may further comprise a display unit which rearranges the user identification data provided for the print data extracted by the extracting unit and displays information of the print data together with the user identification data.

Moreover, in the apparatus, the user identification data may be user identification information.

Moreover, in the apparatus, the user identification data may be at least a part of a data name added to a job.

Further, the present invention provided a print processing apparatus for receiving a print job in which authentication information has been set and executing a printing process, comprising a print job storing unit which receives and stores the print job in which the authentication information has been set; an operation panel control unit which receives the authentication information based on a print request; an authentication discriminating unit which compares the authentication information that is based on the print request and has been received through the operation panel control unit with the authentication information of the print job stored in the print job storing unit, thereby discriminating whether or not they coincide; and a print job managing unit which, if a discrimination result by the authentication discriminating unit indicates that they coincide, allows all of the print jobs having the authentication information that coincides with the authentication information based on the print request among the print jobs stored in the print job storing unit to be print-processed.

Moreover, in the apparatus the print job storing unit may have a management information storing area and a print data storing area, and the print job managing unit divides the print job into the authentication information and print data in receiving order of the print jobs, stores the print data into the print data storing area, and stores addresses of the print data into the management information storing area in a lump every the authentication information.

Moreover, in the apparatus, during progress of a printing process of the print job in which the authentication information has been set, if the print job in which the authentication information has been set is further received, the print job managing unit stops the processes for dividing the print job into the authentication information and the print data, storing the print data into the print data storing area, and storing the addresses of the print data into the management information storing area in a lump every the authentication information until the printing process which is being progressed is finished.

Moreover, in the apparatus, when a predetermined printing process is finished, the print job managing unit deletes all of the print data whose printing process has been finished from the print job storing unit.

Moreover, the apparatus may further comprise a secure managing unit which stops the deletion of the print data from the print job storing unit after the end of the printing process, thereby enabling reprint to be designated.

Moreover, the apparatus may further comprise a print engine control unit which allows predetermined print data of a requested number of print copies to be print-processed on the basis of the requested number of print copies received through the operation panel control unit.

Since all of a plurality of print jobs in which the same authentication information has been set by the same user can be printed in a lump by one procedure, there is no need to input the authentication information through the operation panel and individually select the desired print job from the print job list with respect to each of the plurality of print jobs, so that an effect of improvement of the workability is obtained. Further, an effect that the partial print missing due to the erroneous input or the like of the authentication information does not occur is obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing a construction of a print system according to the embodiment 1;

FIGS. 2A and 2B are explanatory diagrams of a format of a print job;

FIG. 10 is an explanatory diagram of a display screen according to an operation panel in the embodiment 2;

FIG. 11 is an explanatory diagram of a display screen according to an operation panel in the embodiment 3.

DETAILED DESCRIPTION OF THE PREFERRED EMBODIMENTS

Figure 3:
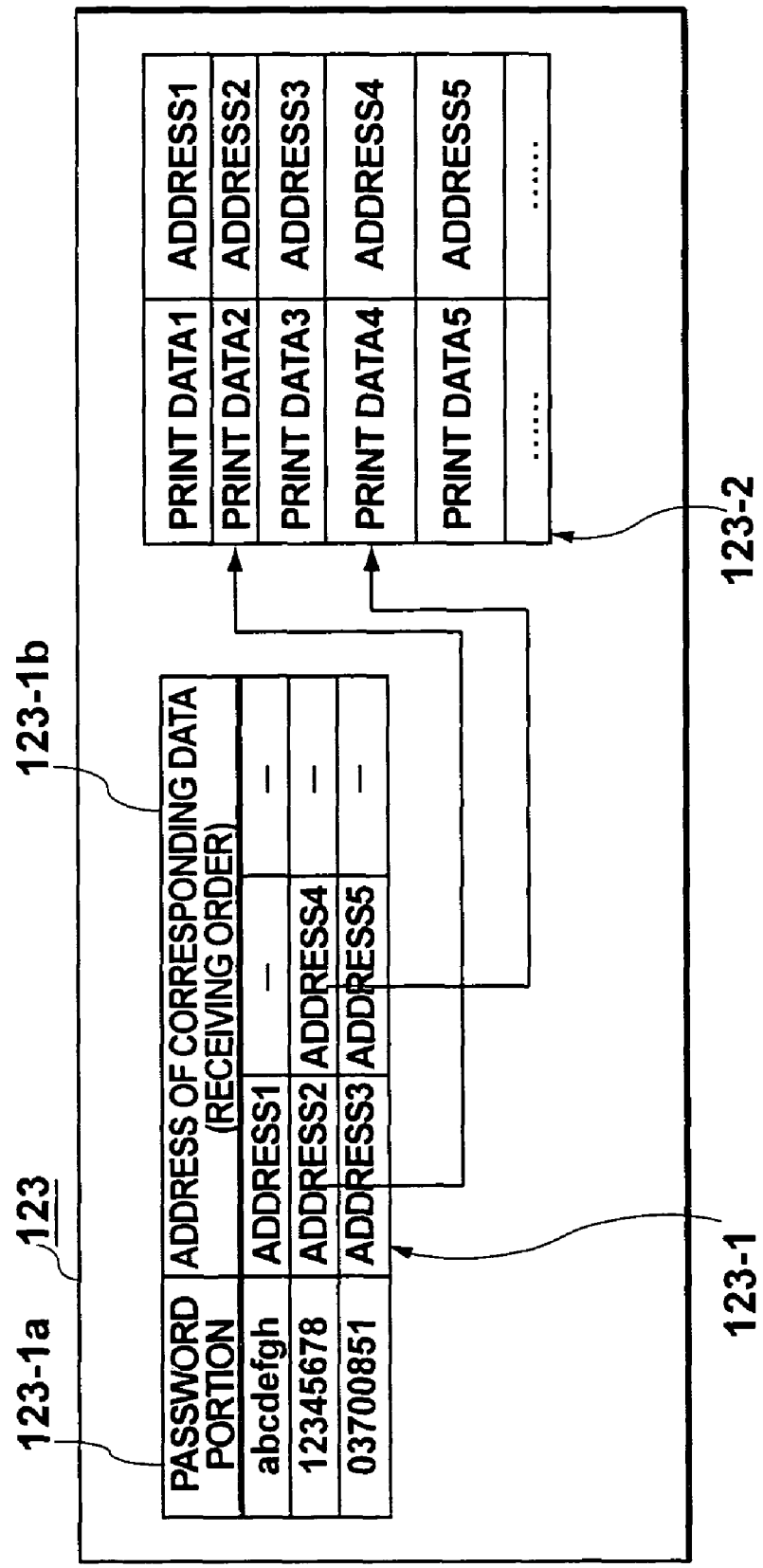
FIG. 3 is an explanatory diagram of a print job storing unit.

All of an operation panel control unit, an authentication discriminating unit, and a print job managing unit in a print processing apparatus of the invention are realized only by a change in control program in the print processing apparatus.

Embodiment 1

FIG. 1 is a block diagram showing a construction of a print system according to the embodiment 1.

As shown in the diagram, the print system according to the embodiment 1 includes print a data forming apparatuses 110 (1), a print processing apparatus 120, and a network 130.

A plurality of print data forming apparatuses 110 [110(i) to 110(n)] are arranged in the network 130. The user forms print data by using such a print data forming apparatus 110 (i.e. 110(1)) and transmits it to a printing apparatus through the network 130. Ordinarily, a host computer according to a PC (personal computer) or the like accepts roles of the print data forming apparatus 110(1). In the invention, particularly, authentication information setting units 110-1 to 110-n are provided in the print data forming apparatus.

Figure 7:
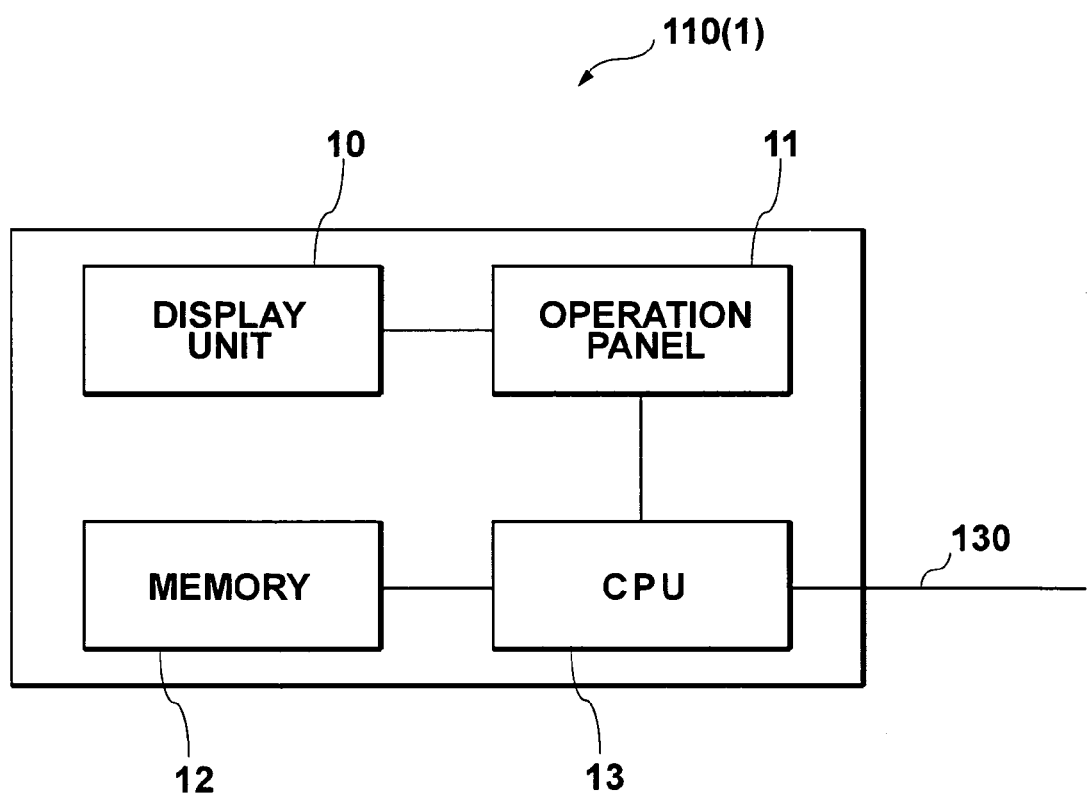
FIG. 7 is a block diagram of an authentication information setting unit.

As shown in FIG. 7, the authentication information setting units 110-1 to 110-n are units for setting job names and passwords into print jobs including the print data which has been formed in the print data forming apparatuses 110(1) to 110(n) and stored in a memory 12.

FIGS. 2A and 2B are explanatory diagrams of a format of the print job.

FIG. 2A shows the format (one example) of the print job. FIG. 2B shows an authentication information setting display screen (one example).

As shown in FIG. 2A, in the print job, a password (one example) has been set at the second row from the top in the diagram as

@PJL ***SECURE PASSWORD=12345678

A job name has been set at the third row from the top in the diagram as

@PJL JOB NAME="secure document"

Further, in the print job, a user ID to identify the user has been set at the fourth row from the top in the diagram as @PJL USR ID="abcd"

That is, in FIG. 2A, the part between the fourth row from the bottom (%% Title:<566973696f...>) and the second row from the bottom (%12345X %–12345X@PJL EOJ) constructs the print data (character data, diagram data, color data and the like) to execute password print read out from memory 12.

In the authentication printing of them, the authentication information setting display screen shown in FIG. 2B is displayed on an operation panel 11 having a display unit 10 of the print data forming apparatus 110(1) (refer to FIG. 7). On the basis of this display screen, the user operates the operation panel 11 and inputs and sets a print format (normal printing, authentication printing, or storage into hard disk), a data name of a job, a password, and a user ID to identify the user. When the print format, the data name of the job, the password, and the user ID are inputted and set from the operation panel 11, the data name of the job, the password, and the user ID are added to the print job stored in the memory 12 and the obtained print job is transmitted to a print processing apparatus 210.

As shown in FIG. 7, the authentication information setting unit 110-1 described above is controlled by a method whereby a CPU 13 provided in the print data forming apparatus 110(1) executes a control program. The control program has previously been stored in a predetermined memory 12 in the print data forming apparatus 110(1).

The print processing apparatus 120 is an image forming apparatus such as a printer apparatus or the like for receiving the print jobs in which the authentication information has been set from the print data forming apparatuses 110(1) to 110(n) through the network 130 and executing a printing process.

As shown in the diagram, the print processing apparatus 120 has an interface (I/F) unit 121, an operation panel unit 122, a print control unit 125, a print engine unit 124, and a print job storing unit 123.

The I/F unit 121 is a portion for processing the print job received from each print data forming apparatus 110(1) through the network 130 and sending the processed print job to the print control unit 125. A network interface circuit for communication-connecting the print processing apparatus 120 to the network 130 based on a predetermined protocol and the like are included in the I/F unit 121.

The operation panel unit 122 is a portion for accepting roles of a man-machine interface between the print processing apparatus 120 and the user. A data input unit 122-1 and a data display unit 122-2 are included in the operation panel unit 122. The data input unit 122-1 is a unit for inputting an intention of the user to the print processing apparatus 120 and a keyboard switch or the like is ordinarily used. The data display unit 122-2 is a unit for displaying a message onto a display board, promoting the input of the user intention, and displaying information inputted by the user and a liquid crystal display board or the like is ordinarily used.

The print job storing unit 123 is a storing apparatus such as hard disk, flash memory, or the like for receiving the print job in which the authentication information has been set and storing it. The print job storing unit 123 has therein a management information storing area 123-1 and a print data storing area 123-2.

FIG. 3 is an explanatory diagram of the print job storing unit.

As shown in the diagram, the print job storing unit 123 has the management information storing area 123-1 and the print data storing area 123-2. Two items of a password portion 123-1a and an address 123-1b of the corresponding data are provided in the management information storing area 123-1. The password set in the received print job is stored in the password portion 123-1a. The address in the print data storing area 123-2 of the received print job is stored in the address of the corresponding data. The addresses of the print data of the same password are stored in the same row. The print data has been stored in the print data storing area 123-2. Generally, the print data is stored in receiving order of the print jobs. This address coincides with the address stored in the address 123-1b of the corresponding data.

The print engine unit 124 is an image forming mechanism for printing the print job received by the I/F unit 121 from the print data forming apparatus 110(1) through the network 130 by the number of copies requested by the user under the control of the print control unit 125 and outputting the print copies.

The print control unit 125 is a portion for controlling a series of operations which is executed until the print engine unit 124 print-outputs the print copies on the basis of the print job received from the I/F unit 121. The print control unit 125 has therein an operation panel control unit 125-1, an authentication discriminating unit 125-2, a print job managing unit 125-3, and a print engine control unit 125-4.

The operation panel control unit 125-1 is a portion for controlling the operation panel unit 122 so as to display a predetermined display screen onto the data display unit 122-2, receiving the intention of the user in an interactive manner, and notifying the user of a control state in the apparatus, information indicative of an error occurring in the print engine unit 124, or the like. Particularly, in the embodiment, the operation panel control unit 125-1 is a portion for receiving the authentication information (password, job name, etc.) from the print requestor.

The authentication discriminating unit 125-2 is a portion for comparing the authentication information (password, job name, etc.) based on the print request of the print requestor received through the operation panel control unit 125-1 with the authentication information (password, job name, etc.) of the print job stored in the management information storing area 123-1 (FIG. 3) in the print job storing unit 123, thereby discriminating whether or not they coincide.

The print job managing unit 125-3 is a portion for dividing the print job into the authentication information (password, job name, etc.) and the print data in receiving order of the print jobs, storing the print data into the print data storing area 123-2 (FIG. 3), and allowing the addresses of the print data to be stored into the management information storing area 123-1 (FIG. 3) in a lump every password. The print job managing unit 125-3 is also the portion for presenting the print data to be printed to the print engine control unit 125-4 on the basis of a discrimination result by the authentication discriminating unit 125-2. Further, the print job managing unit 125-3 is the portion for deleting all of the print data whose printing processes have been finished from the print job storing unit 123 (FIG. 1) when the print engine control unit 125-4 finishes a predetermined printing process.

The print engine control unit 125-4 controls the print engine unit 124 on the basis of instructions from the operation panel control unit 125-1, authentication discriminating unit 125-2, and print job managing unit 125-3 and allows the print engine unit 124 to execute the process for printing the necessary number of print copies.

Each of the units in the print control unit 125 is a control unit which is activated by a method whereby a CPU provided in the print processing apparatus 120 executes a predetermined control program which has previously been stored in a ROM.

Subsequently, the operation of the embodiment 1 will be described with reference to flowcharts. First, the operation of the print data forming apparatus 110(1) (FIG. 1) will be described and, subsequently, the operation of the print processing apparatus 120 (FIG. 1) will be described in step order.

Figure 4:
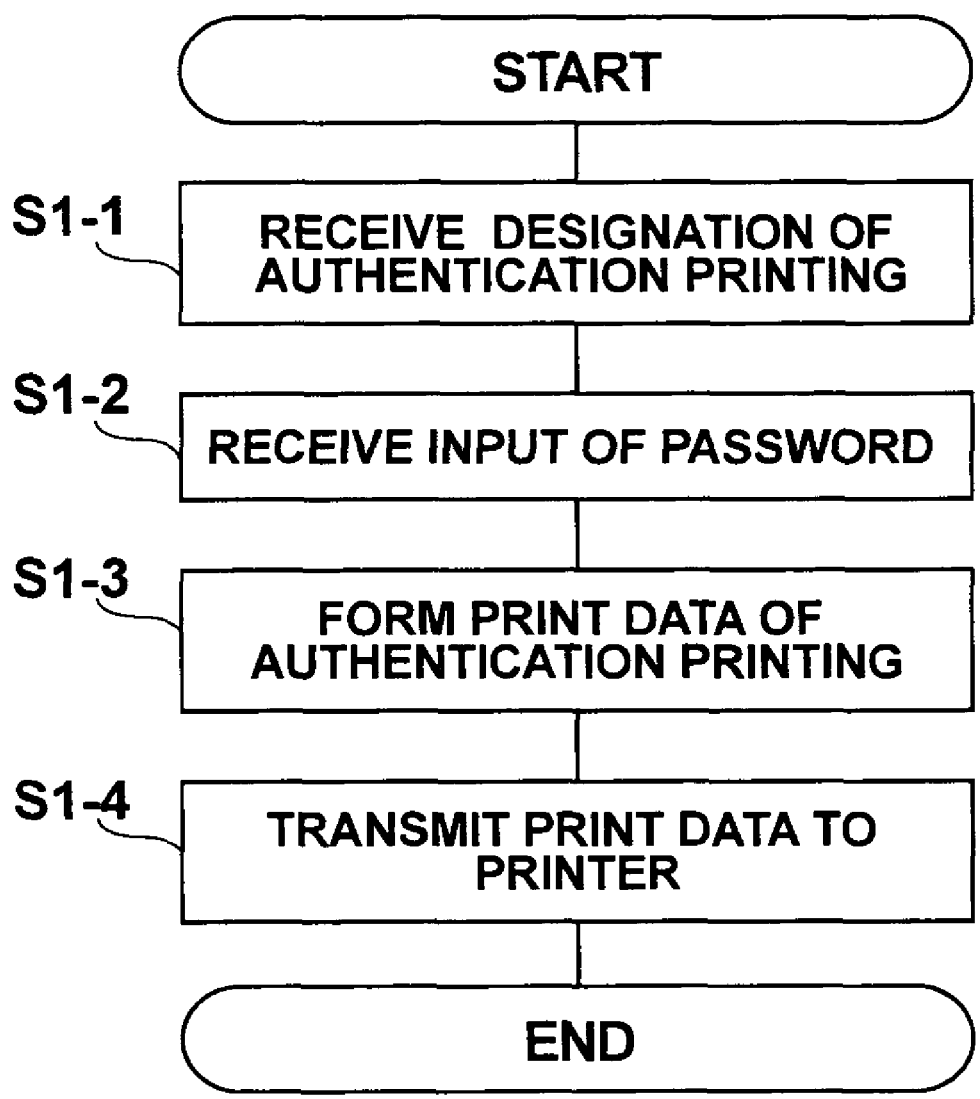
FIG. 4 is a flowchart (on the side of a print data forming apparatus) for the embodiment 1.

FIG. 4 is the flowchart (on the side of the print data forming apparatus) for the embodiment 1.

Step S1-1:
The authentication information setting unit 110-1 (FIG. 1) displays a print option shown in FIG. 2B onto the operation panel and receives the designation of the authentication printing by the user. Since the processes in the case where the designation of the normal printing or the storage into the hard disk is received are substantially the same as those in the conventional print system, their explanation is omitted here.

Step S1-2:
The authentication information setting unit 110-1 (FIG. 1) displays the print option shown in FIG. 2B onto the operation panel and allows the user to set and input the password and the job name.

Step S1-3:
The print data forming apparatus 110(1) (FIG. 1) receives the print data inputted by the user after completion of the procedures of steps S1-1 and S1-2.

Step S1-4:
The print data forming apparatus 110(1) (FIG. 1) forms a print job shown in FIG. 2A, transmits it to the print processing apparatus 120 (FIG. 1) through the network 130 (FIG. 1), and finishes the processing flow.

Figure 5:
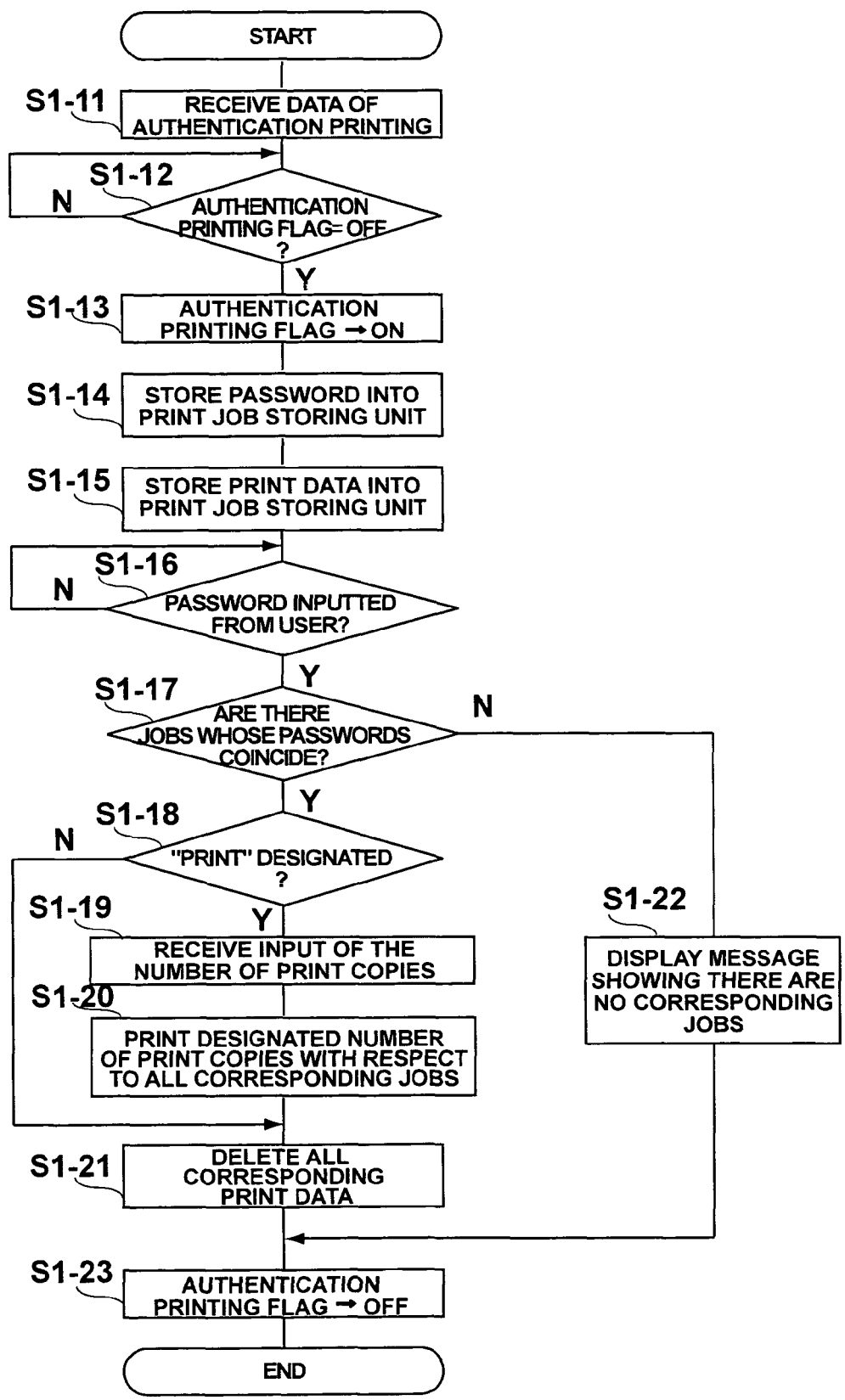
FIG. 5 is a flowchart for the embodiment 1.

FIG. 5 is the flowchart (on the side of the printing apparatus) for the embodiment 1.

FIGS. 6A to 6E are explanatory diagrams of the display screen according to the operation panel in the embodiment 1.

Only the operation in the case where the print job in which the authentication printing has been designated by the user was received will be described here. Since the operation in the case where the print job in which the normal printing has been designated was received is substantially the same as that in the conventional print system, their explanation is omitted here.

Step S1-11:
The I/F unit 121 (FIG. 1) receives the print job shown in FIG. 2A from the print data forming apparatus 110(1) (FIG. 1) through the network 130 (FIG. 1).

Step S1-12:
If the authentication printing is being executed, the system stands by until the end of the authentication printing. After the authentication printing is finished, step S1-13 follows. When the authentication printing is being executed, an authentication printing flag (not shown) is ON.

Step S1-13:
The authentication printing is started and the authentication printing flag is turned on.

Step S1-14:
The print job managing unit 125-3 (FIG. 1) extracts the password from the received print job and stores it into the password portion 123-1a (FIG. 3) of the management information storing area 123-1 in the print job storing unit 123 (FIG. 1). If the same password has already been stored in the password portion 123-1a (FIG. 3) at this time, the extracted password is not stored.

Step S1-15:
The print job managing unit 125-3 (FIG. 1) stores the print data of the print job from which the password has been extracted into the print data storing area 123-2 (FIG. 3). Further, a storing address of the print data is stored into the management information storing area 123-1 (FIG. 3).

Figure 6A:
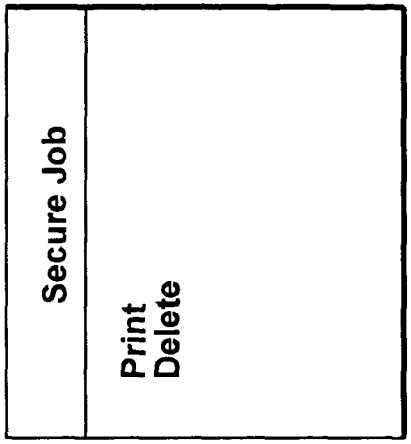
FIGS. 6A to 6E are explanatory diagrams of a display screen according to an operation panel in the embodiment 1.
Figure 6B:
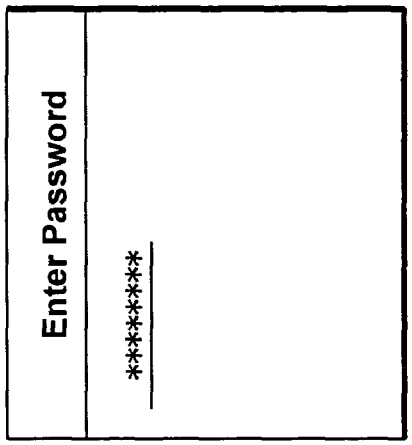

Step S1-16:
The system stands by while waiting for the print request from the print requestor. At this time, a display screen of FIG. 6A is displayed on the operation panel unit 122 by the operation panel control unit 125-1 (FIG. 1). When the print requestor designates "Print Secure Job" in FIG. 6A, a display screen of FIG. 6B is subsequently displayed on the operation panel unit 122. When the print requestor inputs the password on the basis of the display contents, the operation panel control unit 125-1 (FIG. 1) receives the print request (input of the password) and the processing routine advances to step S1-17.

Step S1-17:
The authentication discriminating unit 125-2 (FIG. 1) discriminates whether or not the password which coincides with the received password has already been stored in the password portion 123-1a (FIG. 3). If the coincident password could be searched for, step S1-18 follows. If it cannot be searched for, step S1-22 follows.

Step S1-18:
The operation panel control unit 125-1 (FIG. 1) displays a display screen of FIG. 6C onto the operation panel unit 122. If "Print" is designated by the print requestor, step S1-19 follows. If "Delete" is designated, the processing routine advances to step S1-21.

Step S1-19:
The operation panel control unit 125-1 (FIG. 1) displays a display screen of FIG. 6E onto the operation panel unit 122 (FIG. 1) (initial value is equal to 1) and receives the designation of the number of print copies from the print requestor.

Step S1-20:

When the print job managing unit 125-3 (FIG. 1) notifies the print engine control unit 125-4 (FIG. 1) of addresses of all of the corresponding print data, the print engine control unit 125-4 (FIG. 1) controls the print engine unit 124 (FIG. 1) so as to execute the process for printing the print copies of the number designated from the print requestor with respect to all of the corresponding print data.

Step S1-21:

When the print engine unit 124 (FIG. 1) finishes the predetermined printing processes, the print job managing unit 125-3 (FIG. 1) deletes the print data of all addresses corresponding to the password portion 123-1*a* from the print job storing unit 123 (FIG. 1).

Figure 6C:
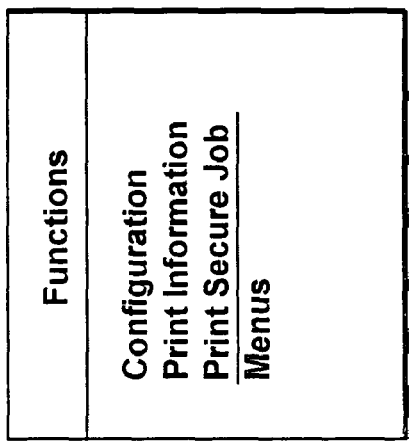
Figure 6D:
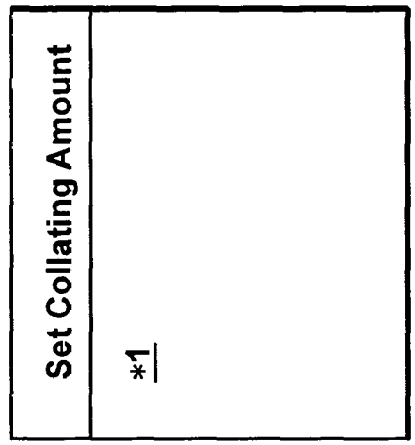

Step S1-22:

The operation panel control unit 125-1 (FIG. 1) displays a display screen of FIG. 6D onto the operation panel unit 122 (FIG. 1) on the basis of a discrimination result (showing that the coincident password could not be searched for) of the authentication discriminating unit 125-2 (FIG. 1).

Step S1-23:

The authentication printing flag is turned off and the processing flow is finished.

As described above, according to the embodiment, in the authentication printing, a plurality of print jobs in which the same user has set the same password can be printed in a lump. Therefore, such an effect that a troublesomeness for the user to select the print job to be printed and input the password every print job can be omitted is obtained. Further, such an effect that a partial missing of the printing, a partial missing of the deletion, or the like can be prevented is obtained.

Moreover, to replace the print data forming apparatus 110 (1), it is possible to use more than one of the print data forming apparatuses 110(1)-110(*n*) to make job of print data added password.

Embodiment 2

Figure 8:
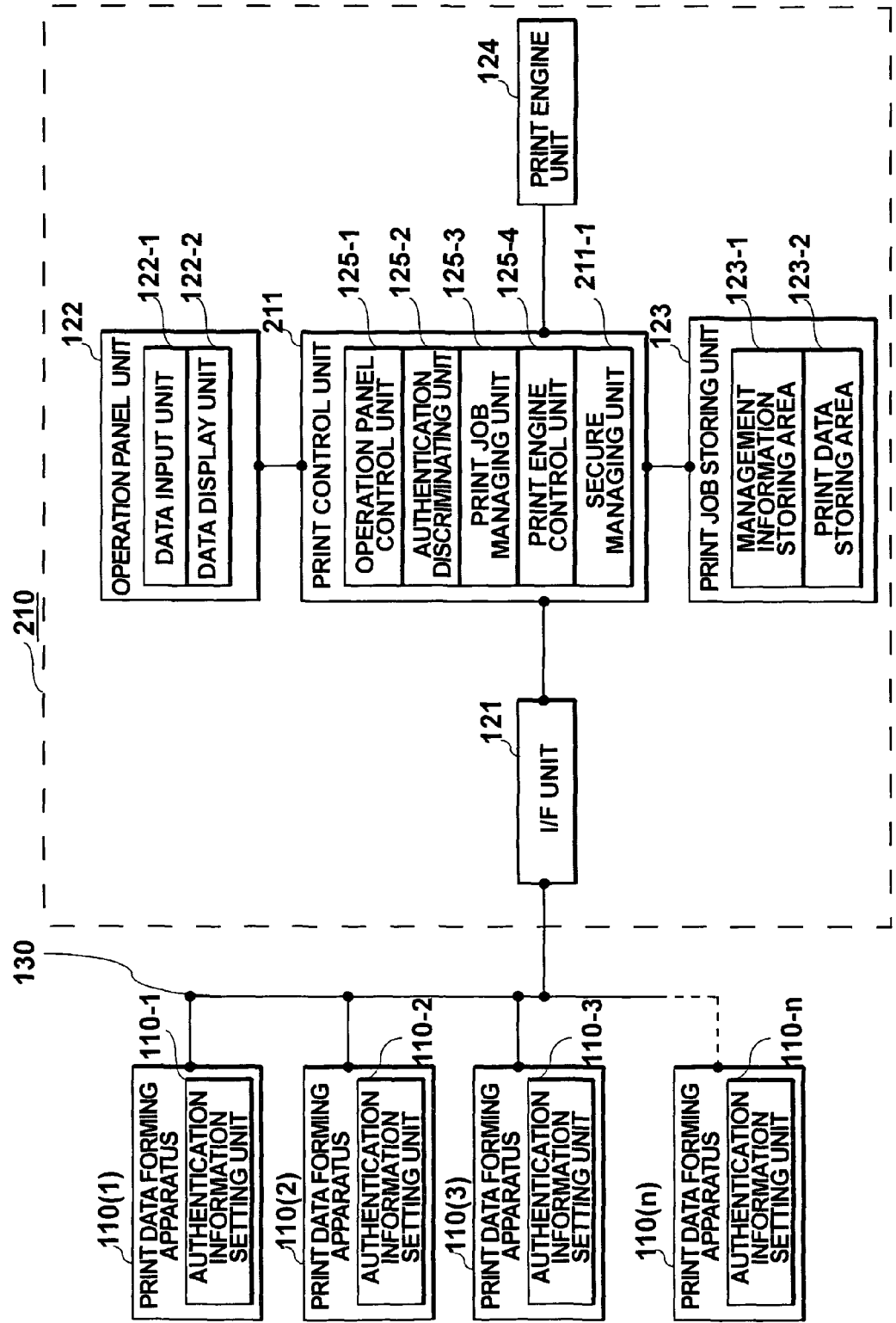
FIG. 8 is a block diagram showing a construction of a print system according to the embodiment 2.

FIG. 8 is a block diagram showing a construction of a print system according to the embodiment 2.

As shown in the diagram, the print system according to the embodiment 2 includes the print data forming apparatuses 110(1) to 110(*n*), the print processing apparatus 210, and the network 130. Only portions different from those of the embodiment 1 will be described hereinbelow. Portions similar to those of the embodiment 1 are designated by the same reference numerals and their explanation is omitted here.

As shown in the diagram, the print processing apparatus 210 has the I/F unit 121, the operation panel unit 122, a print control unit 211, the print engine unit 124, and the print job storing unit 123.

The print control unit 211 is a portion for controlling a series of operations which is executed until the print engine unit 124 print-outputs the print copies on the basis of the print job received from the I/F unit 121. The print control unit 211 has therein the operation panel control unit 125-1, the authentication discriminating unit 125-2, the print job managing unit 125-3, the print engine control unit 125-4, and a secure managing unit 211-1.

The secure managing unit 211-1 is a portion for enabling the data to be left or reprinting to be designated after completion of the printing in accordance with a request from the user.

The units of the print control unit 211 are activated by the method whereby the CPU provided in the print processing apparatus 120 executes the predetermined control program which has previously been stored in the ROM.

The operation in the embodiment 2 will now be described with reference to flowcharts. The operations of the print data forming apparatuses 110(1) are similar to those in the embodiment 1.

That is, in the authentication printing of them, the authentication information setting display screen shown in FIG. 2B is displayed on the operation panel 11 having the display unit 10 of the print data forming apparatus 110(1) (refer to FIG. 7). On the basis of this display screen, the user operates the operation panel 11 and inputs and sets the print format (normal printing, authentication printing, or storage into hard disk), the data name of the job, the password, and the user ID to identify the user. When the print format, the data name of the job, the password, and the user ID are inputted and set from the operation panel 11, the data name of the job, the password, and the user ID are added to the print job stored in the memory 12 and the obtained print job is transmitted to the print processing apparatus 210.

As shown in FIG. 7, the authentication information setting unit 110-1 described above is controlled by the method whereby the CPU 13 provided in the print data forming apparatus 110(1) executes the control program. The control program has previously been stored in the predetermined memory 12 in the print data forming apparatus 110(1).

Figure 9:
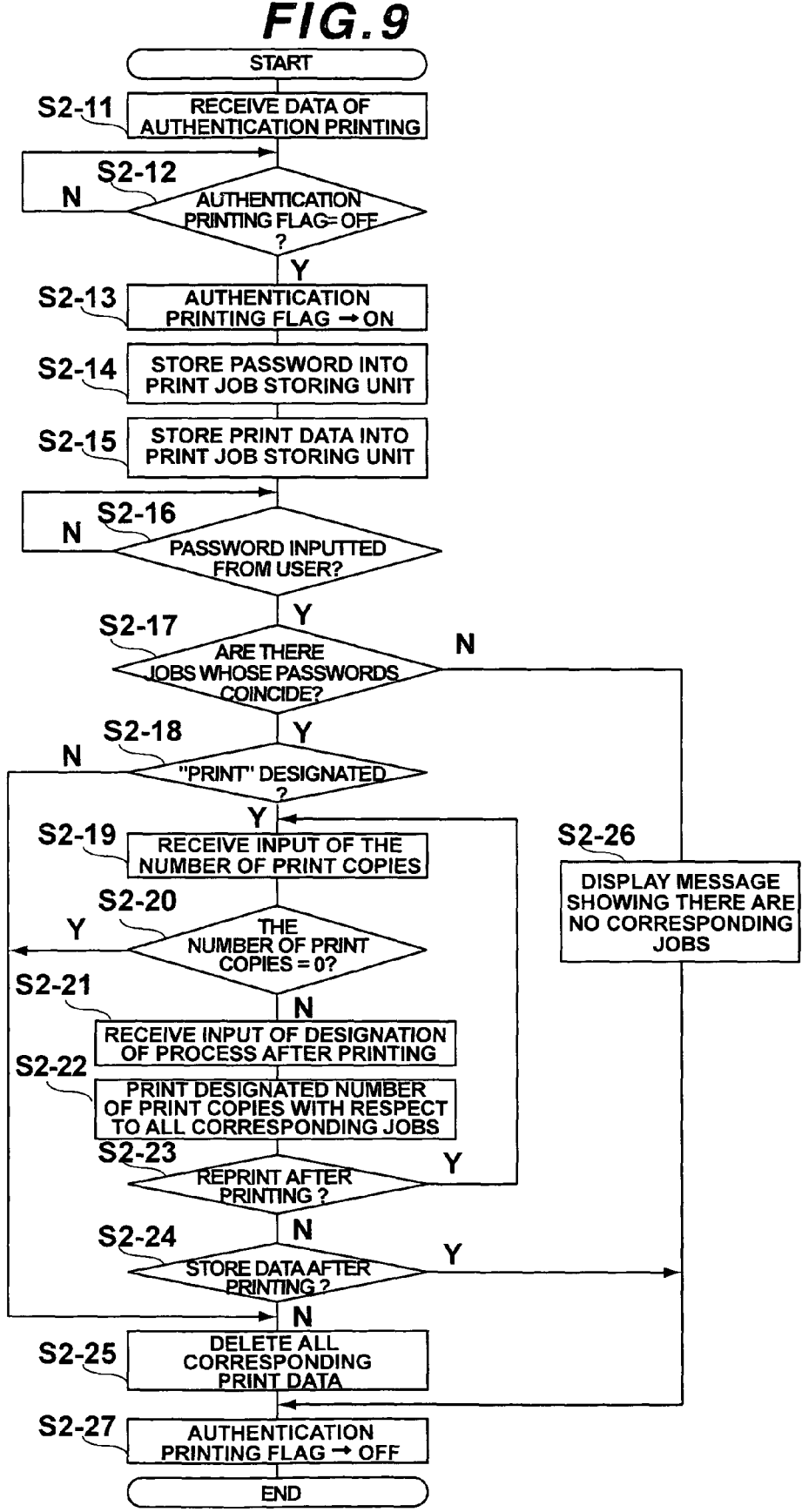
FIG. 9 is a flowchart for the embodiment 2.

FIG. 9 is the flowchart (on the side of the printing apparatus) for the embodiment 2.

FIG. 10 is an explanatory diagram of the display screen according to the operation panel in the embodiment 2.

Only the operation in the case where the print job in which the authentication printing has been designated by the user was received will be described here. Since the operation in the case where the print job in which the normal printing has been designated was received is substantially the same as that in the conventional print system, their explanation is omitted here.

Step S2-11:

The I/F unit 121 (FIG. 8) receives the print job shown in FIG. 2A from the print data forming apparatus 110(1) through the network 130.

Step S2-12:

If the authentication printing is being executed, the system stands by until the end of the authentication printing. After the authentication printing is finished, step S2-13 follows. When the authentication printing is being executed, the authentication printing flag (not shown) is ON.

Step S2-13:

The authentication printing is started and the authentication printing flag is turned on.

Step S2-14:

The print job managing unit 125-3 (FIG. 8) extracts the password from the received print job and stores it into the password portion 123-1*a* (FIG. 3) of the management information storing area 123-1 in the print job storing unit 123. If the same password has already been stored in the password portion 123-1*a* (FIG. 3) at this time, the extracted password is not stored.

Step S2-15:

The print job managing unit 125-3 (FIG. 8) stores the print data of the print job from which the password has been extracted into the print data storing area 123-2 (FIG. 3). Further, the storing address of the print data is stored into the management information storing area 123-1 (FIG. 3).

Step S2-16:

The system stands by while waiting for the print request from the print requestor. At this time, the display screen of FIG. 6A is displayed on the operation panel unit 122 by the operation panel control unit 125-1. When the print requestor designates "Print Secure Job" in FIG. 6A, the display screen of FIG. 6B is subsequently displayed on the operation panel unit 122. When the print requestor inputs the password on the basis of the display contents, the operation panel control unit 125-1 receives the print request (input of the password) and the processing routine advances to step S2-17.

Step S2-17:

The authentication discriminating unit 125-2 (FIG. 8) discriminates whether or not the password which coincides with the received password has already been stored in the password portion 123-1a. If the coincident password could be searched for, step S2-18 follows. If it cannot be searched for, step S2-26 follows.

Step S2-18:

The operation panel control unit 125-1 displays the display screen of FIG. 6C onto the operation panel unit 122. If "Print" is designated by the print requestor, step S2-19 follows. If "Delete" is designated, the processing routine advances to step S2-25.

Figure 6E:
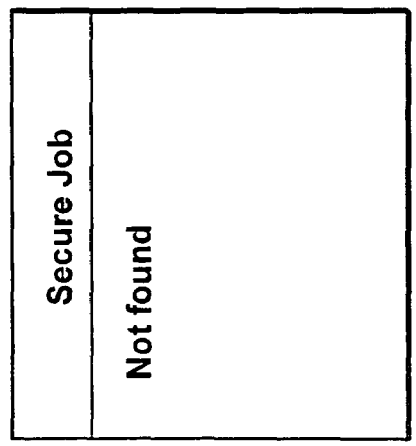

Step S2-19:

The operation panel control unit 125-1 displays the display screen of FIG. 6E onto the operation panel unit 122 (the initial value is equal to 1) and receives the designation of the number of print copies from the print requestor.

Step S2-20:

When the number of print copies designated from the print requestor is equal to 0, the processing routine advances to step S2-25. In the other cases, step S2-21 follows.

Step S2-21:

The secure managing unit 211-1 (FIG. 8) receives the input of the designation of the process after the printing. At this time, the secure managing unit 211-1 instructs the operation panel control unit 125-1 (FIG. 1) to allow a display screen of FIG. 10 to be displayed on the data display unit 122-2 and receives the intention (designation) of the user.

Step S2-22:

When the print job managing unit 125-3 reads out all of the addresses corresponding to the password inputted from the user in step S2-16 from the management information storing area 123-1 and notifies the print engine control unit 125-4 of all of the addresses, the print engine control unit 125-4 reads out the print data in the print data storing area 123-2 corresponding to the transmitted addresses and controls the print engine unit 124 so as to execute the process for printing the print copies of the number designated in step S2-19 with respect to all of the corresponding print data.

Step S2-23:

If "Reprint" is designated in step S2-23, the secure managing unit 211-1 returns to step S2-19. If NO, step S2-24 follows.

Step S2-24:

If YES in step S2-24, the secure managing unit 211-1 advances to step S2-27. If NO, step S2-25 follows.

Step S2-25:

When the print engine unit 124 finishes a predetermined printing process, the print job managing unit 125-3 deletes all of the print data whose printing has been finished and in which all of the passwords coincide from the print job storing unit 123.

Step S2-26:

The operation panel control unit 125-1 displays the display screen of FIG. 6D onto the operation panel unit 122 on the basis of the discrimination result (showing that the coincident password could not be searched for) of the authentication discriminating unit 125-2.

Step S2-27:

The authentication printing flag is turned off and the processing flow is finished.

As described above, according to the embodiment, by providing the secure managing unit 211-1, the mode for allowing the data to be left/reprinted after the end of the printing can be designated. Therefore, in addition to the effects of the embodiment 1, an effect that since only one copy of a secret document is printed, it is confirmed on the spot, and the necessary number of print copies can be added, it is possible to flexibly cope with various situations while keeping the security is obtained.

Moreover, to replace the print data forming apparatus 110 (1), it is possible to use more than one of the print data forming apparatuses 110(1)-110(n) to make job of print data added password.

Embodiment 3

A print system of the embodiment has substantially the same construction as that in the block diagram shown in FIG. 8.

The embodiment 3 presumes a case where a common password is added to each section and an individual ID is added to each user in the section. That is, after the user inputted the password from an operation unit of the print processing apparatus 210 and selected the print jobs by the password, the user IDs and the data names of the jobs are read out from the corresponding print jobs and the jobs are sorted and displayed in order of the user IDs.

When a part of the data names of the print jobs is inputted, only the corresponding print jobs are further extracted and displayed. The user selects and inputs the user ID from the operation unit of the print processing apparatus 210, thereby selecting the print job of the corresponding password+the user ID (+at least a part of the data name of the job) and executing the printing process.

The operation of the embodiment 3 will now be described with reference to a flowchart shown in FIG. 12.

The operation of the print data forming apparatus 110(1) is similar to that in the embodiment 1.

That is, in the authentication printing of them, the authentication information setting display screen shown in FIG. 2B is displayed on the operation panel 11 having the display unit 10 of the print data forming apparatus 110(1) (refer to FIG. 7). On the basis of this display screen, the user operates the operation panel 11 and inputs and sets the print format (normal printing, authentication printing, or storage into hard disk), the data name of the job, the password, and the user ID to identify the user. When the print format, the data name of the job, the password, and the user ID are inputted and set from the operation panel 11, the data name of the job, the password, and the user ID are added to the print job stored in the memory 12 and the obtained print job is transmitted to the print processing apparatus 210.

As shown in FIG. 7, the authentication information setting unit 110-1 described above is controlled by the method whereby the CPU 13 provided in the print data forming apparatus 110(1) executes the control program. The control program has previously been stored in the predetermined memory 12 in the print data forming apparatus 110(1).

FIG. 11 is an explanatory diagram of the display screen according to the operation panel in the embodiment 3.

Only the operation in the case where the print job in which the authentication printing has been designated by the user was received will be described here. Since the operation in the case where the print job in which the normal printing has been designated was received is substantially the same as that in the conventional print system, their explanation is omitted here.

Figure 12:
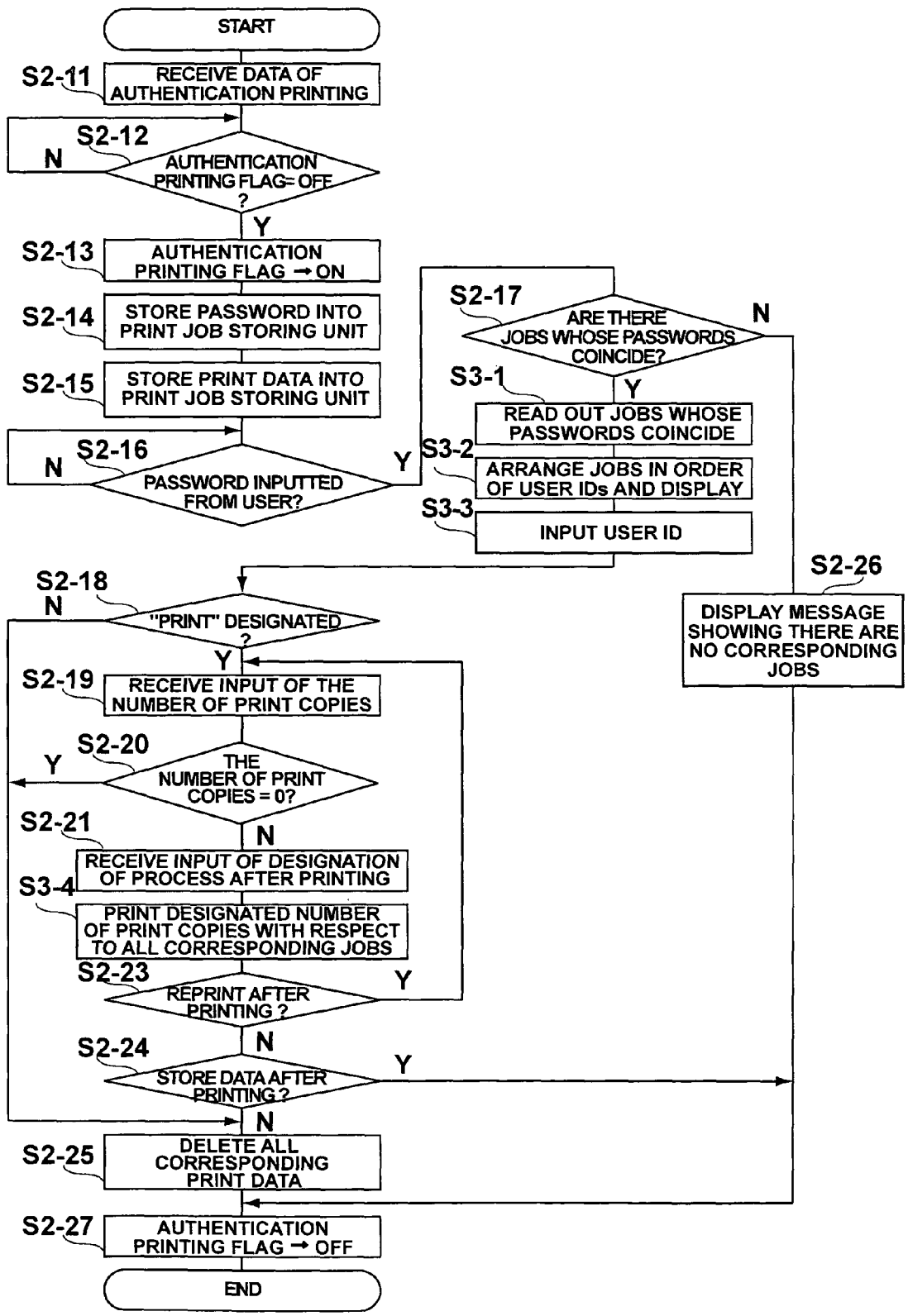
FIG. 12 is a flowchart for the embodiment 3.

Step S2-11:

As shown in FIG. 12, the I/F unit 121 (FIG. 8) receives the print job shown in FIG. 2A from the print data forming apparatus 110(1) through the network 130.

Step S2-12:

If the authentication printing is being executed, the system stands by until the end of the authentication printing. After the authentication printing is finished, step S2-13 follows. When the authentication printing is being executed, the authentication printing flag (not shown) is ON.

Step S2-13:

The authentication printing is started and the authentication printing flag is turned on.

Step S2-14:

The print job managing unit 125-3 (FIG. 8) extracts the password from the received print job and stores it into the password portion 123-1a (FIG. 3) of the management information storing area 123-1 in the print job storing unit 123. If the same password has already been stored in the password portion 123-1a (FIG. 3) at this time, the extracted password is not stored.

Step S2-15:

The print job managing unit 125-3 (FIG. 8) stores the print data of the print job from which the password has been extracted into the print data storing area 123-2 (FIG. 3). Further, the storing address of the print data is stored into the management information storing area 123-1 (FIG. 3).

Step S2-16:

The system stands by while waiting for the print request from the print requestor. At this time, the display screen of FIG. 6A is displayed on the operation panel unit 122 by the operation panel control unit 125-1. When the print requestor designates "Print Secure Job" in FIG. 6A, the display screen of FIG. 6B is subsequently displayed on the operation panel unit 122. When the print requestor inputs the password on the basis of the display contents, the operation panel control unit 125-1 receives the print request (input of the password) and the processing routine advances to step S2-17.

Step S2-17:

The authentication discriminating unit 125-2 (FIG. 8) discriminates whether or not the password which coincides with the received password has already been stored in the password portion 123-1a. If the coincident password could be searched for, step S3-1 follows. If it cannot be searched for, step S2-26 follows.

Step S3-1:

The authentication discriminating unit 125-2 reads out the print jobs whose passwords coincide with the password inputted from the print job storing unit 123 in step S2-14 and reads out the data names added to the print jobs and the user IDs to identify the users.

Step S3-2

The authentication discriminating unit 125-2 arranges the user IDs in ascending order and displays the user IDs onto the data display unit 122-2 in the operation panel unit 122 together with the data names of the corresponding print jobs as shown in FIG. 11.

Step S3-3:

The data input unit 122-1 receives an input for selecting one or a plurality of user IDs on the basis of a display screen of FIG. 11. When a predetermined character train (for example, 999) showing all user IDs is inputted, the authentication discriminating unit 125-2 determines that all of the user IDs have been selected.

If at least a part (for example, "print data") of the data name is inputted in addition to a symbol (capital letter "J") showing the data name like "J print data", the authentication discriminating unit 125-2 selects and extracts only the jobs corresponding to at least a part of the data name, displays them onto the data display unit 122-2 (for example, "print data 1", "print data 2"), and further promotes the user to select and input the user ID.

Step S2-18:

The operation panel control unit 125-1 displays the display screen of FIG. 6C onto the operation panel unit 122. If "Print" is designated by the print requestor, step S2-19 follows. If "Delete" is designated, the processing routine advances to step S2-25.

Step S2-19:

The operation panel control unit 125-1 displays the display screen of FIG. 6E onto the operation panel unit 122 (the initial value is equal to 1) and receives the designation of the number of print copies from the print requestor.

Step S2-20:

When the number of print copies designated from the print requestor is equal to 0, the processing routine advances to step S2-25. In the other cases, step S2-21 follows.

Step S2-21:

The secure managing unit 211-1 (FIG. 8) receives the input of the processing designation after the printing. At this time, the secure managing unit 211-1 instructs the operation panel control unit 125-1 (FIG. 1) to allow the data display unit 122-2 to display the display screen of FIG. 10 and receives the intention (designation) of the user.

Step S3-4:

The print job managing unit 125-3 reads out all of the addresses corresponding to the password inputted from the user in step S2-16 from the management information storing area 123-1 and reads out the user ID and the data name of the job from the print data of the print job stored in the corresponding address in the print data storing area 123-2.

Whether or not the read-out user ID coincides with the user ID inputted from the user is discriminated. The print engine control unit 125-4 is notified of the address related to the corresponding user ID (address of the job corresponding to the data name of the print job and the user ID when the data name of the print job is selected in step S3-3).

The print engine control unit 125-4 reads out the print data in the print data storing area 123-2 corresponding to the transmitted address, controls the print engine unit 124, and executes the process for printing the print copies of the number designated in step S2-19 with respect to all of the corresponding print data.

Step S2-23:

If "Reprint" is designated in step S2-23, the secure managing unit 211-1 returns to step S2-19. If NO, step S2-24 follows.

Step S2-24:

If YES in step S2-24, the secure managing unit 211-1 advances to step S2-27. If NO, step S2-25 follows.

Step S2-25:

When the print engine unit 124 finishes the predetermined printing process, the print job managing unit 125-3 deletes all of the print data whose printing has been finished and whose passwords coincide from the print job storing unit 123.

Step S2-26:

The operation panel control unit 125-1 displays the display screen of FIG. 6D onto the operation panel unit 122 on the basis of the discrimination result (showing that the coincident password could not be searched for) of the authentication discriminating unit 125-2.

Step S2-27:

The authentication printing flag is turned off and the processing flow is finished.

Moreover, to replace the print data forming apparatus 110 (1), it is possible to use more than one of the print data forming apparatuses 110(1)-110(*n*) to make job of print data added password.

As described above, according to the embodiment, even if the common password is used, all of the print data of the user can be extracted and printed in a lump by the user ID every user.

Although the invention has been described above with respect to the case where it is adapted to the printing apparatus, the invention is not limited to such an example but can be also applied to a facsimile apparatus, a copying apparatus, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A print system comprising:
   a print data forming apparatus which forms and outputs print data to which authentication information has been added; and
   a print processing apparatus which receives the print data added with said authentication information and stores it into a print data storing unit,
   wherein said print processing apparatus includes
   an authentication information input unit which inputs the authentication information,
   a first extracting unit which extracts all of the print data added with the authentication information that coincides with said input authentication information from said print data storing unit,
   a data supplying unit which supplies all of the print data extracted by said first extracting unit to a printing unit, and
   a display unit which rearranges user identification data provided for the print data extracted by said first extracting unit and displays information of said print data together with said user identification data.

2. The system according to claim 1, further comprising:
   a user identification input unit which inputs the user identification data; and
   a second extracting unit which extracts the print data corresponding to said user identification data from the print data extracted by said first extracting unit,
   and wherein said data supplying unit supplies the print data extracted by said second extracting unit.

3. The system according to claim 2, wherein said user identification data is user identification information.

4. The system according to claim 2, wherein said user identification data is at least a part of a data name added to a job.

5. A print system comprising:
   a print data forming apparatus having an authentication information setting unit which sets authentication information into a print job; and
   a print processing apparatus having
   a print job storing unit which receives and stores the print job in which said authentication information has been set, wherein said print job storing unit has a management information storing area and a print data storing area,
   an operation panel control unit which receives authentication information based on a print request,
   an authentication discriminating unit which compares the authentication information that is based on said print request and has been received through said operation panel control unit with the authentication information of the print job stored in said print job storing unit, thereby discriminating whether or not they coincide, and
   a print job managing unit which, if a discrimination result by said authentication discriminating unit indicates that they coincide, allows a plurality of print jobs having the authentication information that coincides with the authentication information based on said print request among print jobs stored in said print job storing unit to be print-processed, wherein said print job managing unit forms said authentication information and print data from the print job according to a receiving order of said plurality of print jobs, stores the print data into said print data storing area, and stores addresses of said print data into said management information storing area according to each of said authentication information.

6. The system according to claim 5, wherein during progress of a printing process of the print job in which said authentication information has been set, if the print job in which the authentication information has been set is further received, said print job managing unit stops the processes for forming said authentication information and the print data from the print job, storing the print data into said print data storing area, and storing the addresses of said print data into said management information storing area according to said authentication information until said printing process which is being progressed is finished.

7. The system according to claim 5, wherein when a predetermined printing process is finished, said print job managing unit deletes all of the print data whose printing process has been finished from said print job storing unit.

8. The system according to claim 7, further comprising a secure managing unit which stops the deletion of the print data from said print job storing unit after the end of said printing process, thereby enabling reprint to be designated.

9. The system according to claim 5, further comprising a print engine control unit which allows predetermined print data of a requested number of print copies to be print-processed on the basis of the requested number of print copies received through said operation panel control unit.

10. A print processing apparatus for receiving print data to which data authentication information is related and executing a printing process, comprising:
    a print data storing unit which receives the print data to which said data authentication information is related and stores it;
    a process authentication information input unit which inputs process authentication information before printed matter is outputted;
    a first extracting unit which extracts the print data to which said data authentication information corresponding to said process authentication information is related;
    a print data output unit which outputs all of the print data extracted by said first extracting unit to a printing unit; and
    a display unit which rearranges user identification data provided for the print data extracted by said first extracting unit and displays information of said print data together with said user identification data.

11. The apparatus according to claim 10, further comprising:
    a user identification input unit which inputs the user identification data; and
    a second extracting unit which extracts the print data corresponding to said user identification data from the print data extracted by said first extracting unit, and wherein said print data output unit outputs the print data extracted by said second extracting unit.

12. The apparatus according to claim 11, wherein said user identification data is user identification information.

13. The apparatus according to claim 11, wherein said user identification data is at least a part of a data name added to a job.

14. A print processing apparatus for receiving a print job in which authentication information has been set and executing a printing process, comprising:
 a print job storing unit which receives and stores the print job in which said authentication information has been set, wherein said print job storing unit has a management information storing area and a print data storing area;
 an operation panel control unit which receives the authentication information based on a print request;
 an authentication discriminating unit which compares the authentication information that is based on said print request and has been received through said operation panel control unit with the authentication information of the print job stored in said print job storing unit, thereby discriminating whether or not they coincide; and
 a print job managing unit which, if a discrimination result by said authentication discriminating unit indicates that they coincide, allows a plurality of print jobs having the authentication information that coincides with the authentication information based on said print request among print jobs stored in said print job storing unit to be print-processed, wherein said print job managing unit forms said authentication information and print data from the print job according to a receiving order of said plurality of print jobs, stores the print data into said print data storing area, and stores addresses of said print data into said management information storing area according to each of said authentication information.

15. The apparatus according to claim 14, wherein during progress of a printing process of the print job in which said authentication information has been set, if the print job in which the authentication information has been set is further received, said print job managing unit stops the processes for forming said authentication information and the print data from the print job, storing the print data into said print data storing area, and storing the addresses of said print data into said management information storing area according to said authentication information until said printing process which is being progressed is finished.

16. The apparatus according to claim 14, wherein when a predetermined printing process is finished, said print job managing unit deletes all of the print data whose printing process has been finished from said print job storing unit.

17. The apparatus according to claim 16, further comprising a secure managing unit which stops the deletion of the print data from said print job storing unit after the end of said printing process, thereby enabling reprint to be designated.

18. The apparatus according to claim 14, further comprising a print engine control unit which allows predetermined print data of a requested number of print copies to be print-processed on the basis of the requested number of print copies received through said operation panel control unit.

* * * * *